(12) United States Patent
Chou (10) Patent No.: US 6,195,807 B1
(45) Date of Patent: Mar. 6, 2001

(54) CURVED LENS COMBINATION FOR SWIMMING/DIVING GOGGLES

(76) Inventor: Terry Chou, No. 12, Hsin Ho Herng Road, Tainan City (TW)

( * ) Notice: Subject to any disclaimer, the term of this patent is extended or adjusted under 35 U.S.C. 154(b) by 0 days.

(21) Appl. No.: 09/376,391

(22) Filed: Aug. 18, 1999

(51) Int. Cl.[7] ........................................ A61F 9/02
(52) U.S. Cl. ................... 2/428; 351/43; 359/665
(58) Field of Search ........................... 2/428, 430, 440, 2/439; 351/43; 359/665

(56) References Cited

U.S. PATENT DOCUMENTS

| | | | |
|---|---|---|---|
| 2,437,642 | * 3/1948 | Henroteau | 359/665 X |
| 2,490,873 | * 12/1949 | Johnson | 359/665 |
| 2,525,921 | * 10/1950 | Madan et al. | 359/665 |
| 3,040,616 | * 6/1962 | Simpson | 351/43 X |
| 4,341,204 | * 7/1982 | Bloxsom | 359/665 X |
| 4,373,788 | * 2/1983 | Herbert | 351/43 |

* cited by examiner

*Primary Examiner*—Peter Nerbun
(74) *Attorney, Agent, or Firm*—Charles E. Baxley (57) ABSTRACT

A lens combination is provided for a pair of swimming/diving goggles having a goggle frame. The lens combination includes a planar lens mounted to the goggle frame and a curved lens mounted in front of the planar lens, thereby defining a space between the planar lens and the curved lens for receiving water. The curved lens includes an outer surface and an inner surface. The planar lens includes an outer surface and an inner surface. The space is filled with water. When the lens combination is used in water such that the outer surface of the curved lens, the inner surface of the curved lens, and the outer surface of the planar lens contact with water, thereby allowing formation of clear image when viewing an object in water.

8 Claims, 8 Drawing Sheets

CURVED LENS COMBINATION FOR SWIMMING/DIVING GOGGLES

BACKGROUND OF THE INVENTION

1. Field of the Invention

The present invention relates to a curved lens combination for swimming/diving goggles that has no refraction power change when used in water, provides improved safety, and reduces water resistance.

2. Description of the Related Art

Figure 11:
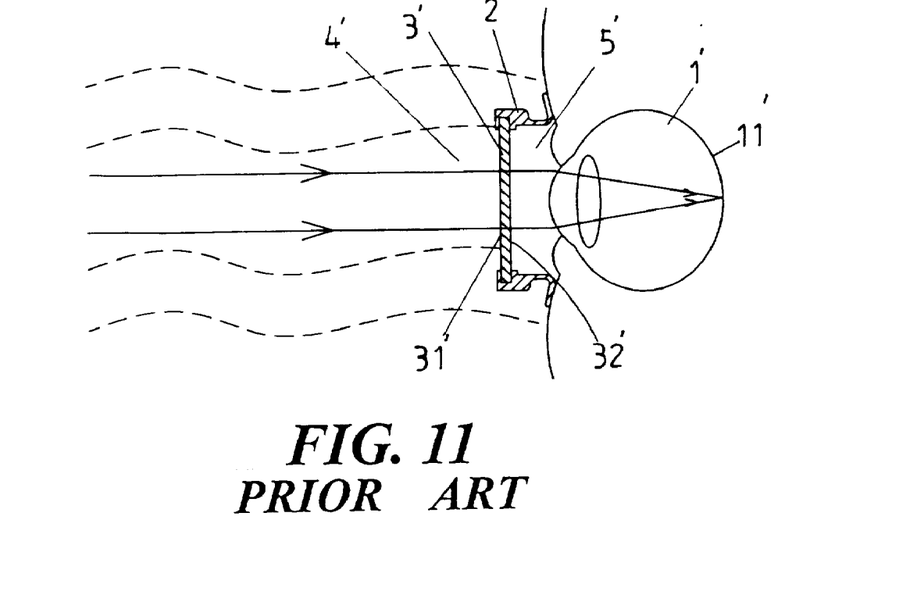
FIG. 11 is a sectional view illustrating underwater use of a pair of conventional swimming goggles having a lens with two planar sides.

A swimmer or diver often wears a pair of goggles to obtain a good view in addition to protection to his/her eyes. FIG. 11 of the drawings illustrates a pair of conventional swimming goggles 2' that provides close contact with the user's eye sockets to keep the eyes 1' away from water. The lens 3' is substantially planar at both sides thereof without causing refraction of light passing therethrough. An outer surface of the lens 3' contacts with water and an inner surface of the lens 3' contacts with air. The light from an object in water passes through air inside the swimming goggles 2' into the user's eye such that clear image may be properly formed on the user's retina 11'. Namely, the lens 3' does not incur any refraction power change when placed in air or in water such that the image of object can be clearly formed on the user's retina.

Figure 12:
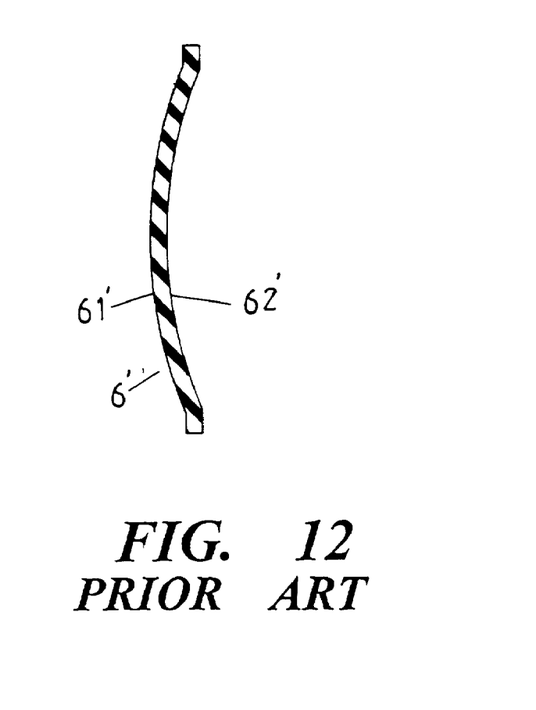
FIG. 12 is a sectional view of a curved lens for a pair of swimming goggles.
Figure 13:
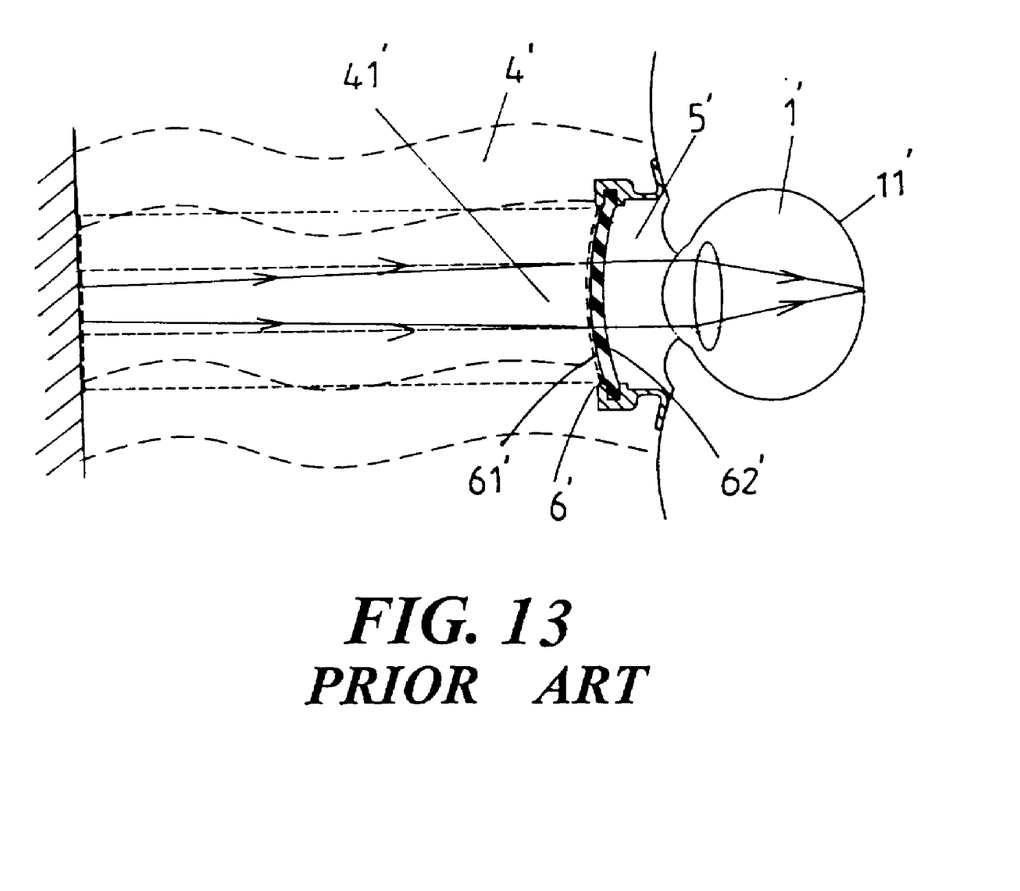
FIG. 13 is a sectional view illustrating underwater use of a pair of swimming goggles with the curved lens in FIG. 12.

Curved lens is used to replace planar lens, as the latter fails to provide aesthetically pleasing effect and increases water resistance. FIG. 12 illustrates a typical curved lens 6' including a spherical outer surface 61' with a refraction power of, e.g., +3 diopters, and a spherical inner surface 62' with a corresponding refraction power of, e.g., −3 diopters. Thus, when in air, the overall optical effect for the light passing through the outer surface 61' and the inner surface 62' is zero. Namely, no refraction power change is incurred. Nevertheless, when in water, the outer surface 61' of the lens 6' contact with water 4' that has a refraction rate of 1.33 and the inner surface 62' of the lens 6' contacts with air 5' that has a refraction rate of 1. In addition, the curved outer surface 61' and the water 4' between the object and the lens 6' together form a concave lens (see the dashed lines). This results in a change in the light-curving rate (i.e., the light-curving rate is not equal to three), yet the light-curving rate from the inner surface 62' to the air 5' still remains unchanged (equal to three). As a result, the image of the object in water formed on the user's retina 11' is smaller than the object. Namely, the so-called refraction power change occurs. This problem is aggravated if the outer surface 61' of the lens 6' has a larger curvature.

The present invention is intended to provide a curved lens combination for swimming/diving that mitigates and/or obviate the above problems.

SUMMARY OF THE INVENTION

It is a primary object of the present invention to provide a curved lens combination for swimming/diving goggles that has no refraction power change when used in water, provides improved safety, and reduces water resistance.

In accordance with the present invention, a lens combination is provided for a pair of swimming/diving goggles having a goggle frame. The lens combination comprises a planar lens mounted to the goggle frame and a curved lens mounted in front of the planar lens, thereby defining a space between the planar lens and the curved lens for receiving water. The curved lens includes an outer surface and an inner surface. The planar lens includes an outer surface and an inner surface. The space is filled with water. When the lens combination is used in water such that the outer surface of the curved lens, the inner surface of the curved lens, and the outer surface of the planar lens contact with water, the lens combination allows formation of clear image when viewing an object in water.

At least one aperture is defined between the planar lens and the curved lens and communicated the space with ambient. Water is filled into the space via the aperture when the curved lens combination is used in water such that the outer surface of the curved lens, the inner surface of the curved lens, and the outer surface of the planar lens contact with water, thereby allowing formation of clear image when viewing an object in water. The water in the space is drained via the aperture when the curved lens combination is in air such that both the inner surface and the outer surface of the curved lens contact with air, thereby allowing formation of clear image when viewing an object in air. A sealing means may be mounted in said at least one aperture for keeping water in the space.

In an embodiment of the invention, the space is an isolated space filled with water. In another embodiment of the invention, the curved lens is directly and securely attached to the outer surface of the planar lens. In a further embodiment of the invention, the curved lens is adhered to the outer surface of the planar lens. In still another embodiment of the invention, the planar lens is a portion of the goggle frame, and the curved lens is secured in front of the planar lens.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
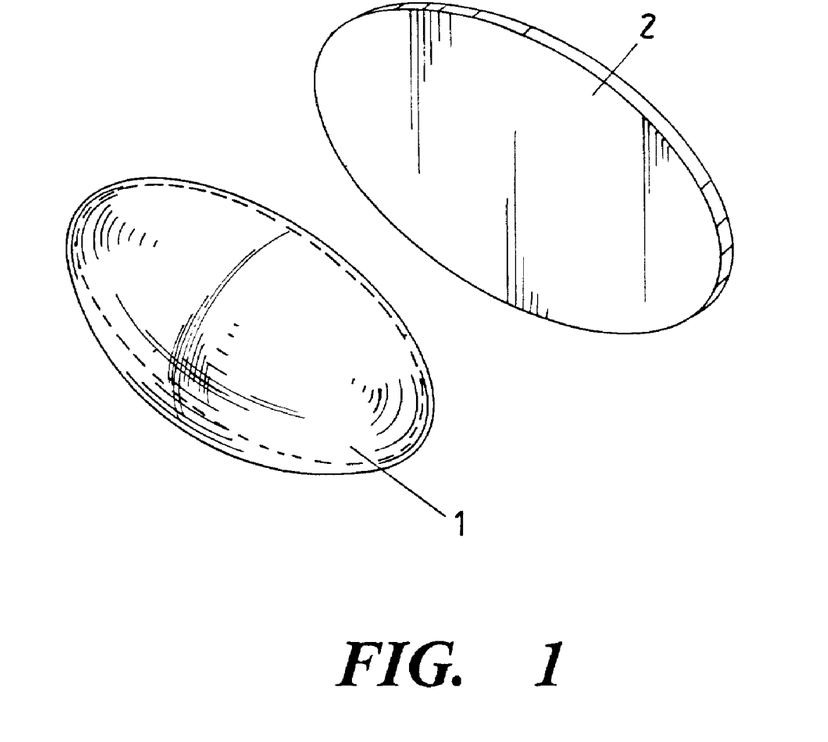
FIG. 1 is an exploded perspective view of a curved lens combination in accordance with the present invention.
Figure 2:
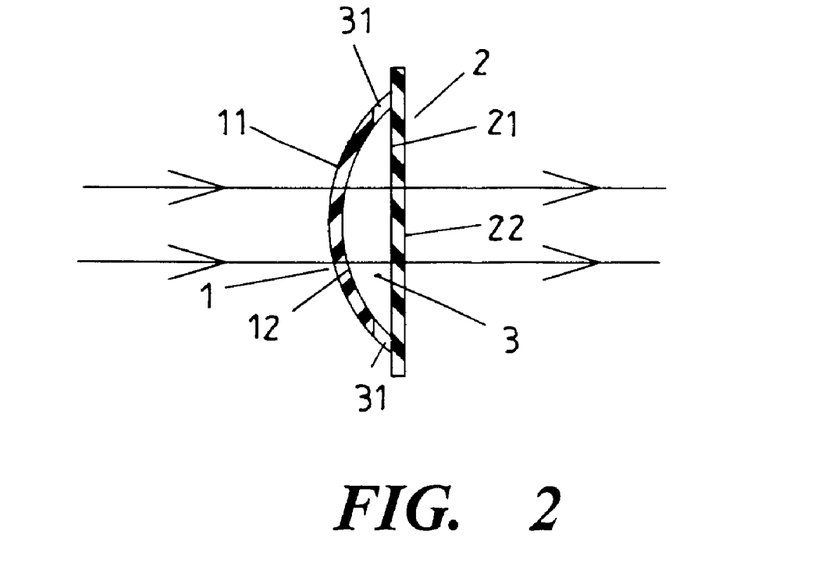
FIG. 2 is a sectional view of the curved lens combination in accordance with the present invention.

Referring to FIGS. 1 through 10 and initially to FIGS. 1 and 2, a curved lens combination for swimming/diving goggles in accordance with the present invention generally includes an inner planar lens 2 and an outer curved lens 1 securely attached to an outer surface 21 of the inner planar lens 2 by adhering or other suitable means. A space 3 is defined between the inner planar lens 2 and the outer curved lens 1. The curved lens 1 includes at least one aperture 31 (two apertures 31 in this embodiment) through which the space 3 is communicated with ambient.

Figure 3:
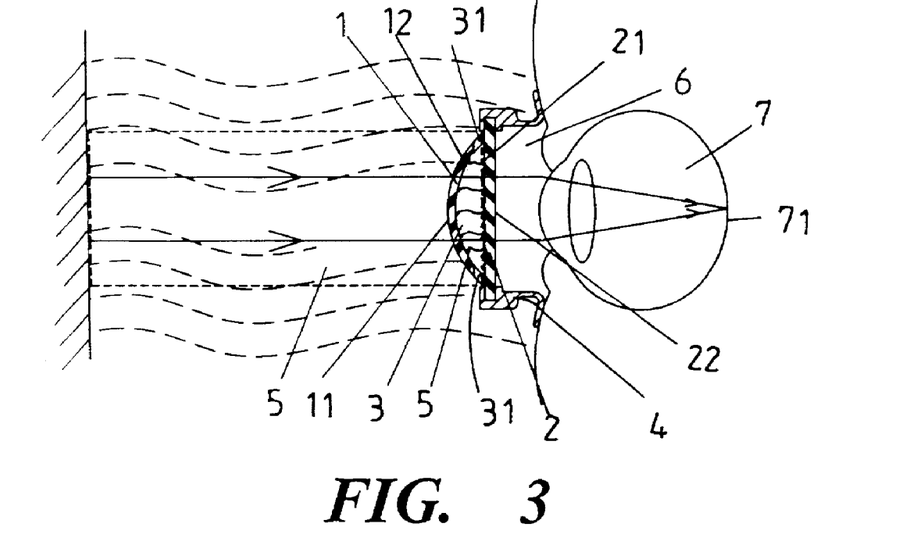
FIG. 3 is a schematic view illustrating underwater use of a pair of swimming goggles with the curved lens combination in accordance with the present invention.
Figure 4:
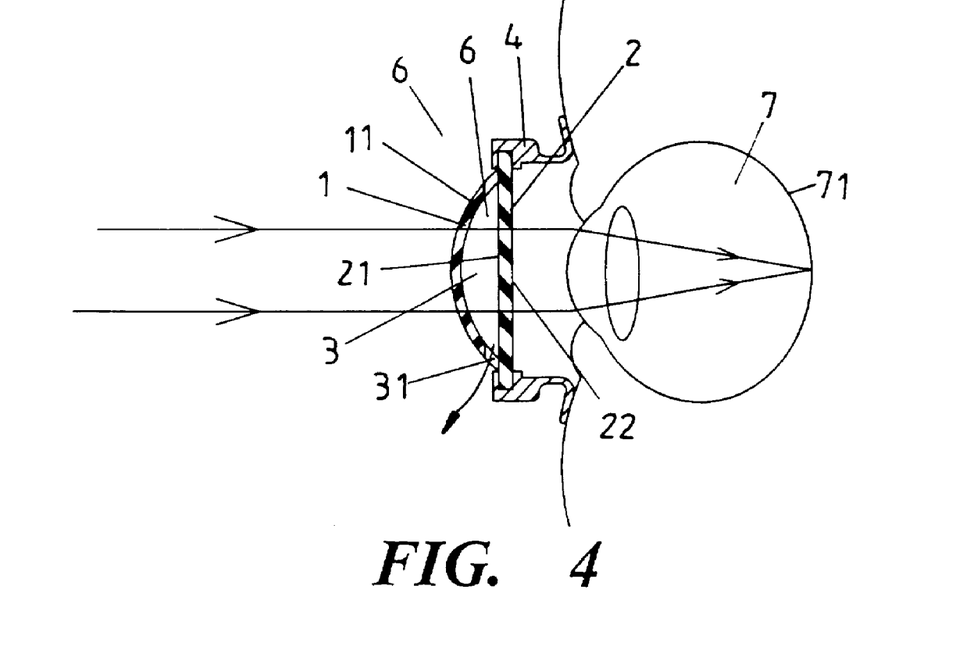
FIG. 4 is a view similar to FIG. 3, illustrating use of the pair of swimming goggles in air.

Referring to FIG. 3, when assembled to a pair of swimming or diving goggle, the curved lens 1 is located outside the goggle frame 4 to provide an aesthetically pleasing effect. When in water, water 5 immediately fills the space 3 via the apertures 31 such that all of the inner surface 12 and the outer surface 11 of the curved lens 1 and the outer surface 21 of the planar lens 2 contact with water 5 and thus have the same refraction rate. As a result, a planar transparent layer (see the dashed lines) is formed in the front of the outer surface 21 of the planar lens 2. Thus, no refraction power change occurs when light passes through the curved lens 1 and the planar lens 2. Meanwhile, no refraction occurs when the light passes through the planar lens 2 that contacts with water 5 and air 6. Accordingly, light from an object passes through the outer surface 21 and the inner surface 22 of the planar lens 2 and the air 6 and thus forms a clear image on the retina 71 of the user's eye 7.

When in air 6, water in the space 3 drains via the lower aperture 31 such that both the outer surface 11 and the inner surface 12 of the curved lens 1 contact with air 6. No refraction power change occurs when the light passes through the curved lens 1 and the planar lens 2 and thus forms a image on the retina 71 of the user's eye, best shown in FIG. 4.

Figure 5:
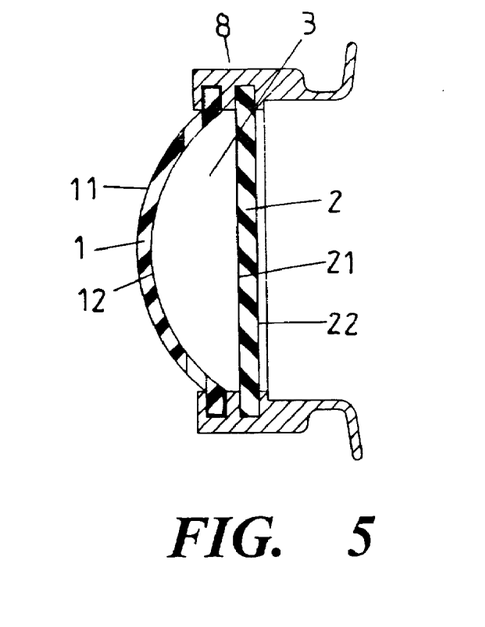
FIG. 5 is a sectional view of another embodiment of the curved lens combination in accordance with the present invention.
Figure 6:
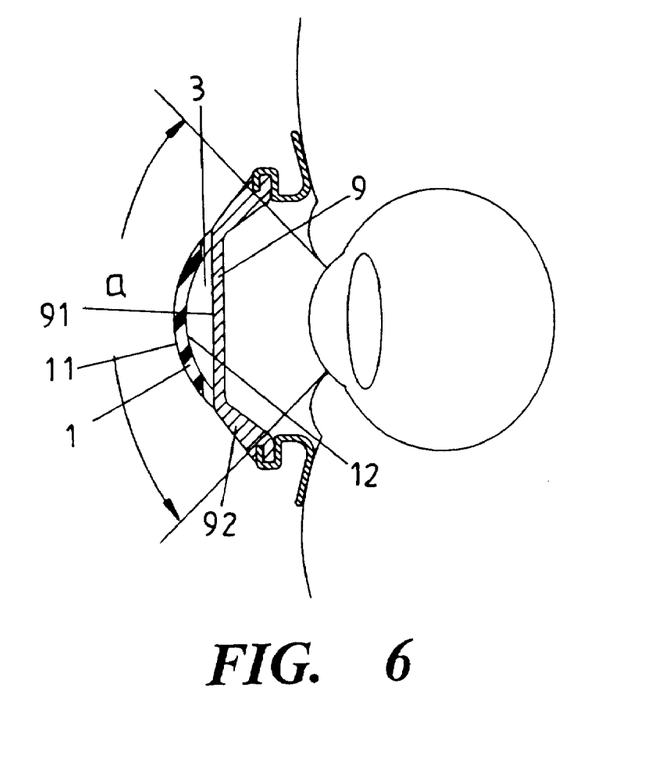
FIG. 6 is a sectional view of a further embodiment of the curved lens combination in accordance with the present invention.

FIG. 5 illustrates another embodiment of the lens combination, wherein the planar lens 2 and the curved lens 1 are separately embedded in the goggle frame 8, respectively. FIG. 6 illustrates a further embodiment of the lens combination, wherein the curved lens 1 is attached to a planar lens 9 (with a flat outer surface 91) of an existing swimming goggle frame. The planar lens 9 may include a transparent peripheral edge 92 to provide a better view (see range "a") for swimming/diving.

Figure 7:
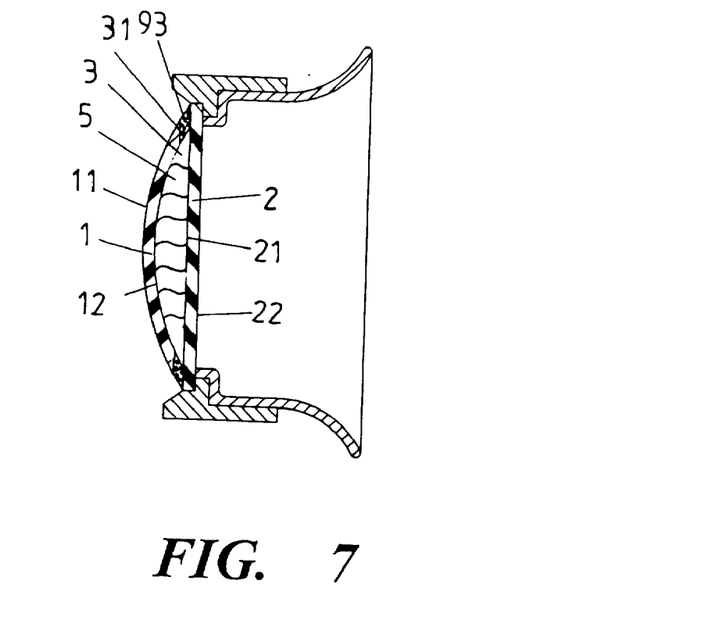
FIG. 7 is a sectional view of still another embodiment of the curved lens combination in accordance with the present invention.
Figure 8:
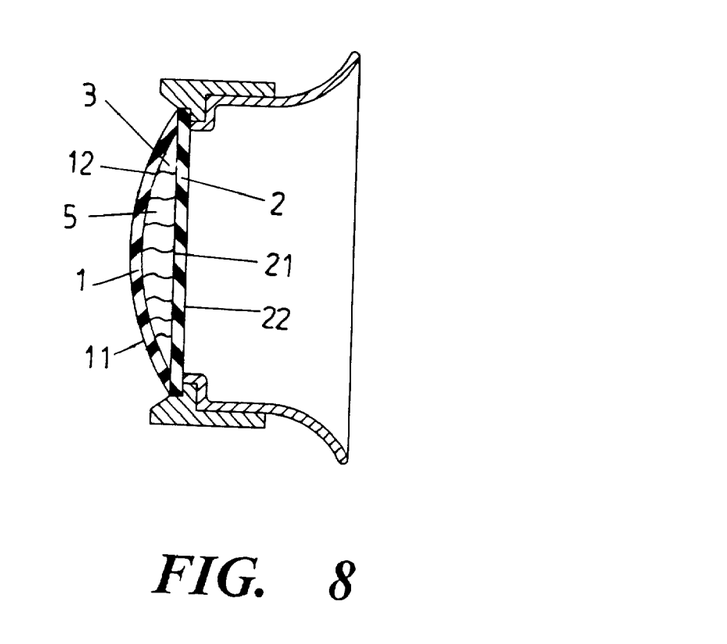
FIG. 8 is a sectional view of yet another embodiment of the curved lens combination in accordance with the present invention.
Figure 9:
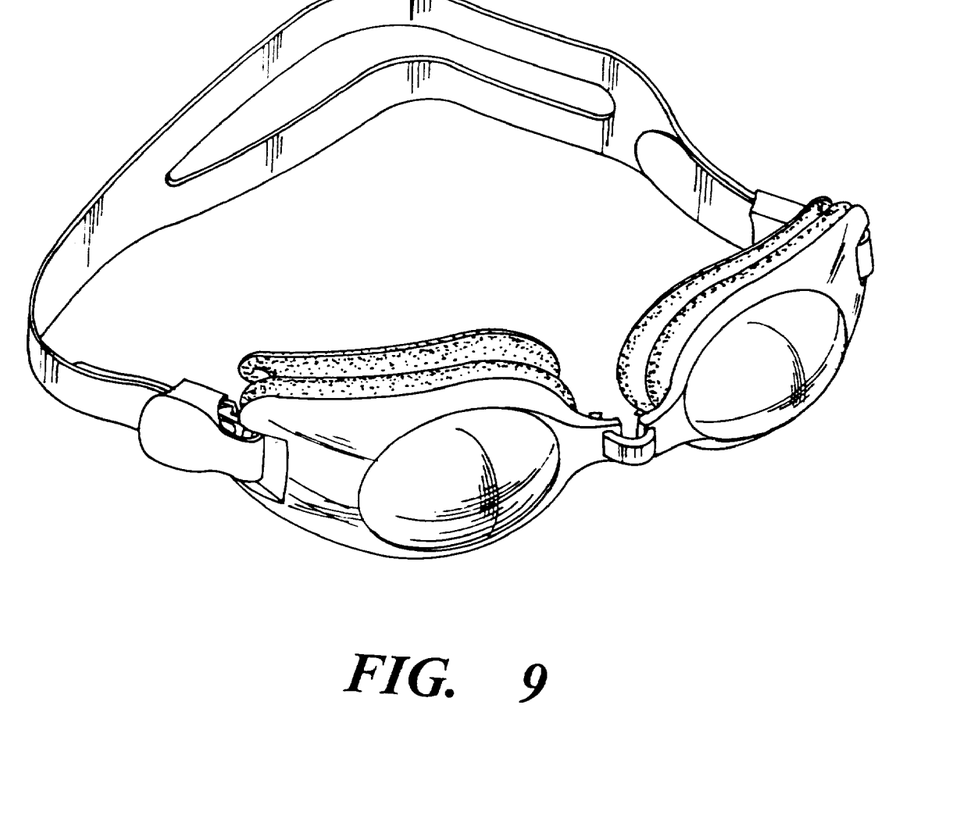
FIG. 9 is a perspective view of a pair of swimming goggles with the curved lens combination in accordance with the present invention.

Referring to FIG. 7, when the space 3 is filled with water 5, sealing means 93 may be mounted into the apertures 31 to keep the water 5 in the space 3. FIG. 8 illustrates a modified embodiment, wherein the apertures 31 in the curved lens 1 are omitted while the space 3 being filled with water 5. Thus, as shown in FIGS. 7 and 8, when the curved lens combination is in air, since the space between the inner surface 12 of the curved lens 1 and the outer surface 21 of the planar lens 2 is filled with water, a convex lens is formed and a refraction power is thus generated. Nevertheless, when in water, no refraction power change occurs, as both the outer surface 11 and the inner surface 12 of the curved lens 1 contact with water and thus forms a transparent layer in front of the outer surface 21 of the planar lens 2. Thus, the curved lens combinations in FIGS. 7 and 8 may be used in water for a long time, which is quite convenient for swimming/diving.

Figure 10:
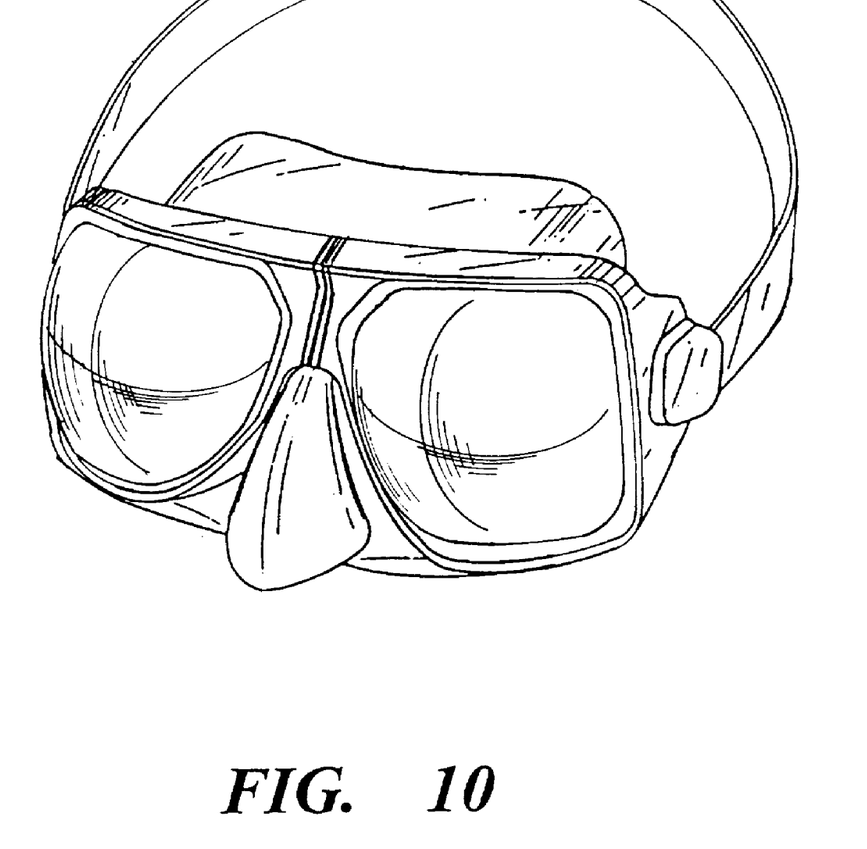
FIG. 10 is a perspective view of a pair of diving goggles with the curved lens combination in accordance with the present invention.

The curved lens combination may be applied to a pair of goggles for swimming (FIG. 9) or diving (FIG. 10). The curved lens provides an aesthetically pleasing effect and an additional protect to avoid direct impact to the planar lens. In addition, the swimming resistance is also reduced. The curved lens combination can be used in water and in air and allows formation of clear image Although the invention has been explained in relation to its preferred embodiment, it is to be understood that many other possible modifications and variations can be made without departing from the spirit and scope of the invention as hereinafter claimed.

What is claimed is:

1. A pair of swimming/diving goggle and a lens combination comprising: a goggle frame, a planar lens and a curved lens consisting of a single transparent element mounted in front of the planar lens, thereby defining a space between the planar lens and the curved lens for receiving water, the curved lens including an outer surface and an inner surface, the planar lens including an outer surface and an inner surface, the space being filled with water, wherein when the lens combination is used in water, the outer surface of the curved lens, the inner surface of the curved lens, and the outer surface of the planar lens contact with water, thereby allowing formation of a clear image when viewing an object in water.

2. The pair of swimming/diving goggle and lens as claimed in claim 1, wherein the curved lens reduces water resistance.

3. The pair of swimming/diving goggle and lens as claimed in claim 1, further comprising at least one aperture defined between the planar lens and the curved lens which allows communication between the space and the ambient, wherein water is filled into the space via said at least one aperture when the curved lens combination is used in water such that the outer surface of the curved lens, the inner surface of the curved lens, and the outer surface of the planar lens contact with water, thereby allowing formation of clear image when viewing an object in water, and wherein the water in the space is drained via said at least one aperture when the curved lens combination is in air such that both the inner surface and the outer surface of the curved lens contact with air, thereby allowing formation of clear image when viewing an object in air.

4. The pair of swimming/diving goggle and lens as claimed in claim 3, further comprising a sealing means mounted in said at least one aperture for keeping water in the space.

5. The pair of swimming/diving goggle and lens as claimed in claim 1, wherein the space is an isolated space filled with water.

6. The pair of swimming/diving goggle and lens as claimed in claim 1, wherein the curved lens is directly and securely attached to the outer surface of the planar lens.

7. The pair of swimming/diving goggle and lens as claimed in claim 1, wherein the curved lens is adhered to the outer surface of the planar lens.

8. The pair of swimming/diving goggle and lens as claimed in claim 1, wherein the planar lens is a portion of the goggle frame, and the curved lens is secured in frong of the planar lens.

* * * * *